United States Patent

[11] 3,600,045

[72] Inventor Kazuo Inoue
 Tokyo, Japan
[21] Appl. No. 753,347
[22] Filed Aug. 19, 1968
[45] Patented Aug. 17, 1971
[73] Assignee Nippon Piston Ring Co. Ltd.
 Chiyoda-ku, Tokyo, Japan
[32] Priority Aug. 24, 1967
[33] Japan
[31] 42/72203

[54] PISTON AND RIDER RING COMBINATION FOR HORIZONTAL RECIPROCATING COMPRESSORS
 3 Claims, 2 Drawing Figs.
[52] U.S. Cl. .................................................. 308/4,
 277/26, 277/173, 277/178
[51] Int. Cl. ........................................... F16c 29/00,
 F16c 17/00
[50] Field of Search .......................................... 277/26,
 178, 173, 200, 236; 92/248, 222; 308/4

[56] References Cited
 UNITED STATES PATENTS
3,039,834 6/1962 Howe ............................ 308/4
1,601,776 10/1926 Sheiring et al. ................ 277/26
1,595,855 8/1926 Clark ............................. 277/236 X
2,048,416 7/1936 Tucker .......................... 277/178

Primary Examiner—Samuel Rothberg
Attorney—Sughrue, Rothwell, Mion, Zinn and Macpeak ABSTRACT: A piston having an annular groove with a radially extending projection. A rider ring carried in the groove and having an annular radially extending recess into which the projection fits. The clearance between either the rider ring and the groove or the projection and the recess is zero under normal temperatures to prevent hammering before the ring has expanded at operating temperatures.

PATENTED AUG 17 1971

3,600,045

INVENTOR
KAZUO INOUE

BY Sughrue, Rothwell, Mion, Zinn & Macpeak
ATTORNEYS.

PISTON AND RIDER RING COMBINATION FOR HORIZONTAL RECIPROCATING COMPRESSORS

BACKGROUND OF THE INVENTION

1. Field of the Invention

This invention relates to a nonlubricated piston for use in horizontal reciprocating compressors (hereinafter referred to as the compressor).

2. Description of the Prior Art

Until now, in order to use compressor without supplying lubricant a piston with a rider ring made of polytetrafluoroethylene has been used to protect the cylinder from metal to metal contact with the piston. However, it has been found that the polytetrafluorotehylene has a much larger coefficient of thermal expansion than that of metallic materials. Therefore when it is used for the rider ring, the piston means is normally provided with a side clearance between the groove for the rider ring and the rider ring, the thermal expansion making the side clearance suitable under running temperatures. Such a system is undesirable because the running of the compressor under conditions of frequent starts and stops causes repeated hammerings due to the large side clearances between the edges of the groove and the rider ring. This often results in being worn into a shape similar to a bellmouth. Consequently, such a worn piston can not hold the rider ring firmly and must be replaced. This phenomenon is caused by the fact that the rider ring must be made wider to support the weight of the piston and rod thereby increasing the mass of the rider ring. Secondly, the large side clearance between the rider ring and the groove for the ring needed to accommodate the thermal expansion of the ring due to large coefficient of thermal expansion of polytetrafluoroethylene increases the force of inertia and results in severe hammering.

SUMMARY OF THE INVENTION

This invention provides an improved piston means for compressors which is made of aluminum, wherein the rider ring and the groove for the ring are protected from the wear normally found in devices of this type having polytetrafluoroethylene rider rings. The piston is provided with an outwardly extended projection at the bottom surface of a circular groove in which the rider ring is carried. The rider ring has an annular recess on the inner surface thereof for engagement with the projection of the groove, whereby the amount of the side clearance between the projection and the recess in zero at normal temperatures while the amount of side clearance allowed for thermal expansion of the ring is defined by the distance between the side surface of the groove and the side surface of the ring.

BRIEF DESCRIPTION OF THE DRAWINGS

Referring now to FIG. 1, the piston 1 made of aluminum carries an annular groove 2 and an annular projection 3 disposed around the bottom of groove 2. The numerals 4 and 4' refer to opposite side surfaces of the groove 2, while the numerals 5 and 5' depict side surfaces of projection 3. A rider ring 6 of polytetrafluoroethylene has a pressure surface 7 and a side surface 8. A circular recess 9 of the ring receives projection 3 of groove 2, the numerals 10 and 10' referring to side surfaces of the recess 9, while the numeral 11 shows the bottom of groove 2.

Figure 1:
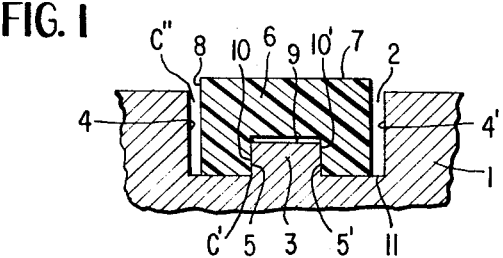
FIG. 1 is a sectional view of one embodiment of a rider ring and piston groove for a horizontal reciprocating piston of the present invention.

Defined between projection 3 and the recess 9 is side clearance C' which is zero at normal temperatures. Side clearances C'' between side surface 4 of groove 2 and side surface 8 of rider ring 6 are provided at normal temperatures for an amount of thermal expansion.

The piston means of the invention is constructed in such a way that the aluminum piston 1 is provided with an integral radial projection 3 on the bottom circumference of groove 2 while rider ring 6 is formed with an annular recess 9 on the inner surface thereof whereby rider ring 6 is inserted into the groove 2 so as to engage the recess 9 with the projections 3 of the groove.

In the conventional piston shown in FIG. 1 comprising a piston having a rectangularly shaped groove and a rider ring made of polytetrafluoroethylene which is engaged into the groove. Replacement of the piston is frequently necessary due to wear at the groove and the side surface of the rider ring under conditions of repeated starting and stopping. In the construction according to the present invention, axial movement of the rider ring is prevented by inner recess 9 of the rider ring being engaged by projection 3 provided on groove 2 of the piston. Consequently, while the compressor repeats starting and stopping, it does not cause hammering wear at side surfaces 4 and 4' of groove 2 since the rider ring according to the invention does not contact these surfaces at low temperatures.

Furthermore, even when the compressor is driven under a normal temperature lower than the maximum temperature, the wear of rider ring 6 and side surfaces 4 and 4' is substantially decreased compared with the conventional piston means because the axial movement of rider ring 6 is restricted by projection 3 of groove 2. Further, what wear there is has the characteristic that it does not wear beyond a certain amount. This is achieved by the recess ring and the projection of the piston.

Figure 2:
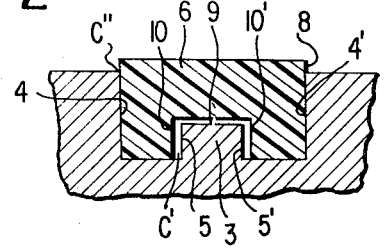
FIG. 2 is a sectional view similar to FIG. 1 but with a somewhat different arrangement of the ring according to the invention.

In the construction having features s described above, the rider ring and the groove does not wear much and they do not wear over the extent of a certain amount so that it can permit a stable performance for a long time. Further the groove for rider ring of the invention does not wear so much that the piston need be replaced, the rider ring of wider size is not needed and the groove is not needed for machining for adjustment. When the principle of this invention is applied to compressors to be run under low temperatures, preferable running can be attained by a modification of the construction as shown in FIG. 2. In that embodiment, provision for thermal expansion is made between projection 3 and recess 9. Clearance C'' between the side surface of rider ring 8 and side surfaces 4 and 4' of the groove is set at zero and clearance C' is set to meet the amount of the heat expansion.

While the invention has been particularly shown and described with reference to preferred embodiments thereof, it will be understood by those skilled in the art that various changes in form and details may be made therein without departing from the spirit and scope of the invention.

What I claim is:

1. In a device having a nonlubricated reciprocating piston with an annular groove carrying a rider ring made of a material having a large coefficient of expansion relative to the piston material, the improvement comprising:
    a. an annular radially extending projection in said groove;
    b. an annular, radially extending recess in said rider ring into which said projection extends;
    c. a first set of clearances between the side surfaces of said rider ring and the side surfaces of said annular groove;
    d. a second set of clearances between the projection and the side surfaces of said recess; and
    e. one of said sets of clearances being set initially at substantially zero at ambient temperature and the other set of clearances being set to meet the amount of thermal expansion of said rider ring to an operating temperature substantially different from ambient to cause the other set of clearances to reach substantially zero at said operating temperature; whereby axial movement of the rider ring is prevented regardless of low or high temperature operation of said compressor relative to ambient temperature 2. The improvement as defined claim 1 wherein said first set of clearances is set at substantially zero at ambient temperature and said second set of clearances is set to meet the thermal expansion.

3. The improvement as defined in claim 1 wherein said second set of clearances is set at substantially zero at ambient temperature and said first set of clearances is set to meet the thermal expansion.